Oct. 8, 1963 V. K. EDER 3,106,061
VECTORING NOZZLE
Filed Nov. 30, 1960

INVENTOR.
Virgil K. Eder
BY
Robert E. McCollum
ATTORNEY

United States Patent Office 3,106,061
Patented Oct. 8, 1963

3,106,061
VECTORING NOZZLE
Virgil K. Eder, Indianapolis, Ind., assignor to General Motors Corporation, Detroit, Mich., a corporation of Delaware
Filed Nov. 30, 1960, Ser. No. 72,786
7 Claims. (Cl. 60—35.55)

This invention relates to a heat dam and gas seal. More particularly, it relates to means to prevent a burnout of a vectoring nozzle gas seal.

In vectoring or swivel type nozzles, the running clearance between the stationary and vectoring nozzle portions provides a passage through which gas can escape from the nozzle. This not only causes a loss in efficiency and thrust, but also immediately subjects the gimbal or trunnion mounts and other parts to the extreme heat of the exhaust gases resulting in a burnout of these parts and failure of the nozzle to vector properly. A gas seal is therefore generally provided in this area to positively prevent this leak of gas. However, known seal materials can withstand such intense heat for only a short period, and therefore, it becomes necessary to provide a heat dam and gas seal upstream from the seal to insulate the seal from the exhaust gas heat for as long as possible. It is a heat dam and gas seal with which the present invention is concerned.

Therefore, it is an object of this invention to provide a heat dam and fluid seal for a vectoring type exhaust nozzle to insulate the nozzle seal against the exhaust gas heat.

It is a further object of the invention to provide a heat dam and fluid seal for a vectoring type nozzle consisting of a metal ring reduced to its molten state by the intense heat of the exhaust gases to flow into the running clearance between the nozzle portions to insulate the nozzle seal from the exhaust gases.

Figure 1:
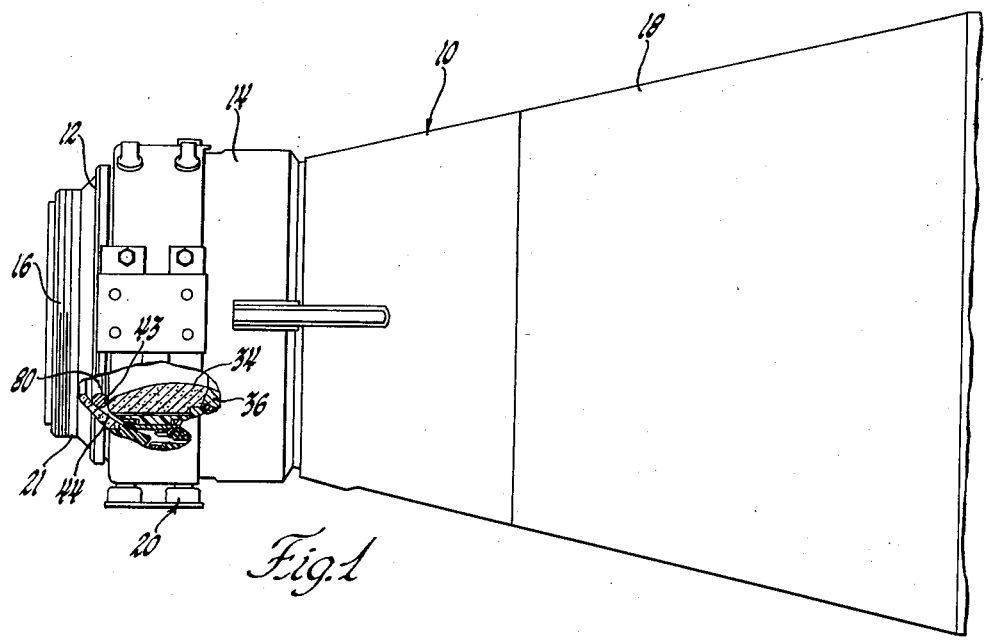
Figure 2:
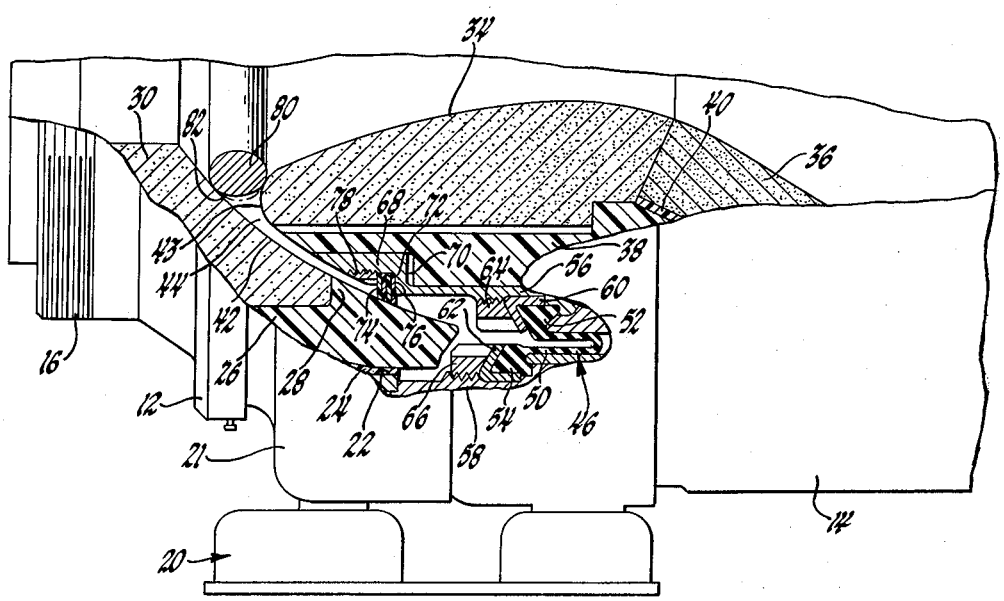

Other objects, features and advantages will become apparent upon reference to the succeeding detailed description of the invention and to the drawings illustrating the preferred embodiment thereof; wherein, FIGURE 1 is a side elevational view with parts broken away and in section of a jet exhaust nozzle embodying the invention; and, FIGURE 2 is an enlarged view of details of FIG. 1.

In general, the invention is concerned with providing a vectoring type nozzle with heat dam and gas seal means to insulate the main nozzle gas seal from the extreme heat of the exhaust gases for the length of time vectoring is required. This mens consists of a metal ring melted by the exhaust gases to flow into and completely fill the clearance between the stationary and vectoring nozzle parts.

FIGURE 1 shows a vectoring or swivel nozzle 10 having a stationary portion 12 and a vectoring portion 14. The stationary portion is adapted in this case to be secured to the converging conical end of a rocket case (not shown) by the screw threads 16 to together form a rocket motor. It will be clear, however, that the nozzle would have use in many installations other than a rocket. The vectoring nozzle portion 14 is formed with a diverging conical exit portion 18 and is pivotally connected to the stationary portion by a gimbal ring type mount indicated generally at 20. This permits a full 360° positioning of the vectoring portion. The vectoring and stationary portions together define a convergent-divergent gas passage through the nozzle with a throat section between.

FIG. 2 shows the details of the throat section more clearly. The stationary nozzle portion 12 has an annular case 21, the inner surface 22 of which is sprayed with a thin coat of heat resistant insulation 24, such as Haveg or Durez. To this is cemented a thicker coat of similar insulation 26. Insulation 26 has a retaining flange 28 adapted to abut a graphite ring 30 secured in the insulation and forming the nozzle throat inlet portion. The throat of the nozzle vectoring portion 14 likewise comprises a contoured carbon ring 34 cemented to and abutted by a conically diverging throat exit portion 36. Both the ring 34 and exit portion 36 are secured within an annular plastic liner 38 of Haveg or the like, the exit portion being separated from liner 38 by other insulation 40. Although the details are not shown, liner 38 is pivotally supported upon the stationary nozzle portion 12 by the gimbal mount 20.

The contours of the stationary and vectoring nozzle portions are as shown to provide the desired convergent-divergent gas passage with smooth and streamlined walls to diminish the heat and friction losses. The contours are also such as to provide a non-interfering close sliding fit between the portions. To these ends, the inner surfaces of both the ring 30 and insulation 26 are smoothly contoured to form a spherical socket like surface 42 for cooperation with the smoothly rounded inlet end 43 of the vectoring nozzle portion.

This construction provides the necessary running clearance between the stationary and vectoring portions, but it also, however, provides a passage 44 permitting the leakage of exhaust gases out of the nozzle. A bag type seal 46 therefore is used to bridge the gap between nozzle portions to prevent this.

Seal 46 comprises an annular rolling fabric seal member 50 having beaded ends 52 and 54. The ends are secured separately to stationary and movable nozzle retaining members 56 and 58 by lip flanges 60 and 62 and spanner nuts 64 and 66. The retaining members are suitably secured to the liner 38 and case 22, respectively. The forward end 68 of retainer 56 fits in a recess 70 in the liner 38 and is arcuately curved to conform to the outer streamlined surface of the liner.

The bag seal is designed to positively prevent the leak of gases from the nozzle and is capable of withstanding high heat. However, the heat of the exhaust gases 5500°–6000° F., for example) and the concentration of these gases against the seal is so intense that the fabric member 50 will burn out if exposed to these hot gases for any length of time. Therefore, a heat dam 72 is provided upstream of the seal to protect it for as long a period as vectoring of the nozzle is required. Once the vectoring is terminated, it is immaterial whether or not the bag seal is burned out by the exhaust gases.

The heat dam includes four annular Teflon or similar type ring seals 74 secured together in a milled recess 76 in the retainer 68 by a spanner nut 78. The rings extend outwardly across the passage or clearance 44 between nozzle portions into a sliding and sealing contact with the surface 42 of the stationary throat portion. The outer ring portions are canted and beveled as shown to conform to the shape of the surface 42. Vectoring of the nozzle therefore slides the heat dam along surface 42 to maintain the seal.

In an installation of this type, the nozzle must occasionally be vectored cold for test purposes, i.e., the swiveling action of the nozzle is tested without fire-up of the engine. During the test, however, the fixed diameter seals 74 tend to cut grooves in the softer plastic insulation 26 and eventually only drag across the surface instead of having a seal fit with it. Therefore, after a number of tests, a large enough clearance exists between the outer edges of the rings and the insulation to permit exhaust gas to leak through the heat dam when the rocket is fired. While this leak would be minute, it would damage the bag seal. Therefore, an additional heat dam and gas seal is placed across the passage 44 at its inlet end.

This additional heat dam and seal consists of an aluminum or other suitable metal ring 80 nestled in the annular inlet to the passage 44 between the downstream edge of carbon ring 30 and the upstream edge of carbon ring 34. The ring is substantially oval in cross section to provide an outer surface 82 having a curvature conforming to the mating surfaces of the carbon rings. The arcuate surface of the ring permits the free vectoring of the nozzle.

The ring has a melting point (1200° F., for example) such that upon fire-up of the rocket motor, the exhaust gases, at 5000°–6000° F., melt the face of the seal exposed to the gas stream, forming a molten pool at this point between the adjacent nozzle portion surfaces. The high gas pressure then forces the molten metal into the passage 44 and against the heat dam 72 as shown in dotted lines to completely fill any of the voids through which gas may escape. The nozzle can still be vectored at this time without interference, however, since the molten metal provides no drag. The passage of exhaust gas to the heat dam 72 is therefore completely blocked, and the only way the heat of the exhaust gases can reach the heat dam is by conduction through the molten metal. The temperature of the molten metal then slowly builds up from the inlet end of passage 44 to the heat dam until the molten metal becomes volatilized. By this time, the heat dam 72 will have begun to char and itself volatilize and expose the bag seal to the high exhaust gas temperature. However, the mass of the metal ring is so chosen that by the time this occurs, the need for vectoring of the nozzle is substantially over. Therefore, it is only necessary that the bag seal be able to withstand the intense heat for a short time, until vectoring is no longer required, which it does.

The operation is believed to be clear from the previous description, and therefore will not be repeated.

From the foregoing, therefore, it will be seen that the invention provides a combination heat dam and gas seal effectively insulating the vectoring nozzle main gas seal from the intense heat of the exhaust gases to permit vectoring of the nozzle for as long a time as is necessary.

While the invention has been illustrated in its preferred embodiment in connection with an exhaust gas jet nozzle, it will be clear to those skilled in the arts to which this invention pertains that many modifications may be made thereto without departing from the scope of the invention, and that it has uses in many installations other than that illustrated.

I claim:

1. A swivel type exhaust gas nozzle having vectoring and stationary nozzle portions with a sliding clearance therebetween, gas seal means secured to said portions and positioned therebetween to prevent the leakage of exhaust gas out of said nozzle through said clearance, and heat dam means between said portions between said gas seal means and the exhaust gases including means adjacent the gas inlet to said clearance changeable from its solid state to a molten state under the heat of said exhaust gases to flow into and fill the clearance between said portions and insulate said gas seal means from the heat of said gases.

2. A swivel type exhaust gas nozzle having vectoring and stationary nozzle portions with a sliding clearance therebetween providing a path for gas leakage out of said nozzle, gas seal means secured to said portions and positioned therebetween to prevent the leakage of exhaust gas out of said nozzle through said clearance, and heat dam means between said portions between said gas seal means and the exhaust gases including a metal ring positioned initially in its solid state adjacent the inlet to said path and changeable into a molten state under the heat of said exhaust gases to flow into and fill the clearance between said portions under the pressure of said exhaust gases to insulate said gas seal means from the heat of said gases.

3. A dirigible nozzle for high temperature gases comprising a stationary upstream portion, a downstream portion swingably mounted on the stationary portion, the two portions having an annular gap between them extending from the interior of the nozzle, and sealing means to prevent gas leakage through the gap during operation of the nozzle comprising a seal extending between the members of a type allowing relative movement of the members, and a solid ring bridging the gap upstream of the said seal, the ring being fusible well below the normal temperature of the gases in operation of the nozzle so as to be fused upon operation of the nozzle and provide a liquid heat barrier upstream of the said seal in the gap.

4. A dirigible nozzle for high temperature gases comprising a stationary upstream portion, a downstream portion swingably mounted on the stationary portion, the two portions having an annular gap between them extending from the interior of the nozzle, and sealing means to prevent gas leakage through the gap during operation of the nozzle comprising a bag seal extending between the members, a solid ring bridging the gap upstream of the said seal, the ring being fusible well below the normal temperature of the gases in operation of the nozzle so as to be fused upon operation of the nozzle and provide a liquid heat barrier upstream of the said seal in the gap, and means in the gap operative to block the liquid heat barrier upstream of the said seal to prevent direct contact of the liquid heat barrier and seal.

5. A dirigible nozzle for high temperature gases comprising a stationary upstream portion, a downstream portion swingably mounted on the stationary portion, the two portions having an annular gap between them extending from the interior of the nozzle, and sealing means to prevent gas leakage through the gap during operation of the nozzle comprising an airtight seal extending between the members, a sliding contact seal extending across the gap upstream of the airtight seal to protect the bag seal, and a solid ring bridging the entrance to the gap upstream of the sliding contact seal, the ring being fusible well below the normal temperature of the gases in operation of the nozzle so as to be fused upon operation of the nozzle and provide a liquid heat barrier upstream of the sliding contact seal in the gap.

6. A dirigible nozzle for high temperature gases comprising a stationary upstream portion, a downstream portion swingably mounted on the stationary portion, the two portions having an annular gap between them extending from the interior of the nozzle, and sealing means to prevent gas leakage through the gap during operation of the nozzle comprising a bag seal extending between the members, a sliding contact seal extending across the gap upstream of the bag seal to protect the bag seal, and a solid ring bridging the entrance to the gap upstream of the sliding contact seal, the ring being fusible well below the normal temperature of the gases in operation of the nozzle so as to be fused upon operation of the nozzle and provide a liquid heat barrier upstream of the sliding contact seal in the gap.

7. A dirigible nozzle for high temperature gases comprising a stationary upstream portion, a downstream portion swingably mounted on the stationary portion, the two portions having an annular gap extending from the interior of the nozzle between them, and sealing means to prevent gas leakage through the gap during operation of the nozzle comprising a solid ring loosely disposed in the gap adjacent the entrance thereto so as to permit swinging of the downstream portion, the ring being fusible below the normal temperature of the gases in operation of the nozzle so as to be fused upon operation of the nozzle and provide a liquid in the gap, and blocking means in the gap operative to block the liquid from being expelled from the gap by gas pressure in the nozzle, the said pressure being contained by the liquid backed up by the blocking means, and the liquid being effective to shield the blocking means temporarily from the nozzle gases.

References Cited in the file of this patent

UNITED STATES PATENTS

| | | |
|---|---|---|
| 1,821,274 | Plummer | Sept. 1, 1931 |
| 2,429,481 | Mohr et al. | Oct. 21, 1947 |

FOREIGN PATENTS

| | | |
|---|---|---|
| 1,246,339 | France | Oct. 10, 1960 |
| 1,022,847 | Germany | Jan. 16, 1958 |